United States Patent [19]

Kyo et al.

[11] Patent Number: 4,814,425

[45] Date of Patent: Mar. 21, 1989

[54] NOVEL ALTERNATE COPOLYMERS

[75] Inventors: Sunao Kyo, Abiko; Katsumi Omura, Kamisu; Akira Mochizuki, Tsukuba, all of Japan

[73] Assignee: Kuraray Co., Ltd., Kurashiki, Japan

[21] Appl. No.: 225,720

[22] Filed: Jul. 28, 1988

[30] Foreign Application Priority Data

Aug. 3, 1987 [JP] Japan ............................. 61-194918

[51] Int. Cl.$^4$ ............................................ C08F 22/40
[52] U.S. Cl. .................................... 526/262; 526/332; 526/333; 526/334; 526/271; 526/309; 526/313; 526/319

[58] Field of Search ............... 526/262, 332, 333, 334, 526/271, 309, 313, 319

[56] References Cited

U.S. PATENT DOCUMENTS 3,651,026  3/1972  Moser et al. ..................... 526/332
3,819,596  6/1974  Grass ................................ 526/332

*Primary Examiner*—Paul R. Michl
*Assistant Examiner*—Alex H. Walker
*Attorney, Agent, or Firm*—Oblon, Fisher, Spivak, McClelland & Maier

[57] ABSTRACT

Novel alternate copolymers consisting of isopentenyl compounds having a specific structure and certain types of unsaturated compounds are provided.

5 Claims, No Drawings

NOVEL ALTERNATE COPOLYMERS

BACKGROUND OF THE INVENTION

1. Field of the Invention

This invention relates to novel alternate copolymers comprising an isopentenyl compound as one constituent.

2. Description of the Related Art

The carbon-carbon double bond of isopentenyl compounds is so low in reactivity that they do not homopolymerize by radical polymerization. Accordingly, few studies have been made on the polymerization of the compounds except that the copolymerization among isopentenyl alcohol or prenyl alcohol and unsaturated carboxylic acids of salts thereof has been proposed only in Japanese Laid-open Patent Application Nos. 59-108010 and 59-102496.

The copolymers obtained by the above processes have a compositional ratio of the isopentenyl alcohol or prenyl alcohol of 15 to 33 mole% and are not alternate copolymers.

An object of the invention is to provide novel alternate copolymers having isopentenyl compounds as one constituent.

Other objects, features and advantages of the invention will become apparent from the following description.

SUMMARY OF THE INVENTION

We have found that isopentenyl compounds whose reactivity has been considered to be very low undergo alternate copolymerization in high efficiency in the presence of specific unsaturated compounds and radical initiators. The present invention is accomplished based on the above finding. More particularly, the present invention provides an alternate copolymer which consists essentially of structural units [I] based on an isopentenyl compound of the following formula (A) or (B)

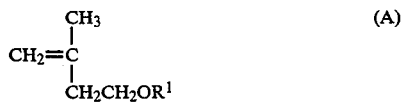

in which $R^1$ represents a hydrogen atom, an alkyl group with or without an ether bond, an acryl group, a cycloalkyl group, an aralkyl group or an acyl group, or

in which $R^2$ is an alkyl group with or without an ether bond, a cycloalkyl group, an aryl group or an aralkyl group, and structural units [II] based on an unsaturated compound selected from the group consisting of maleic anhydride, dialkyl maleates, maleimides, dialkyl fumarates, unsaturated nitriles, and acrylic esters.

DESCRIPTION OF THE PREFERRED EMBODIMENTS

In the above formula (A) representing the isopentenyl compound, $R^1$ represents, as defined above, a hydrogen atom, an alkyl group with or without an ether bond, an aryl group, a cycloalkyl group, an aralkyl group or an acyl group. The alkyl group includes, for example, a methyl group, an ethyl group, a propyl group, a butyl group, a pentyl group, a hexyl group and the like, and has thus preferably from 1 to 6 carbon atoms. The alkyl group having an ether bond includes, for example, a methoxymethyl group, a methoxyethyl group, an ethoxymethyl group, an ethoxyethyl group, a propoxymethyl group, a propoxyethyl group, a butoxymethyl group, a butoxyethyl group, a pentoxymethyl group, a pentoxyethyl group, an isopentenoxymethyl group, an isopentenoxyethyl group, and the like. Examples of the aryl group include a phenyl group, a tolyl group, a xylyl group and the like. The cycloalkyl group includes, for example, a cyclopentyl group, a cyclohexyl group or the like. The aralkyl group includes, for example, a benzyl group, a 1-phenylethyl group, a 2-phenylethyl group, a 3-phenylpropyl group or the like. Examples of the acyl group include a formyl group, an acetyl group, a propionyl group, a butyryl group, a valeryl group, a hexanoyl group, a 2-ethylhexanoyl group, a heptanoyl group, an octanoyl group, a nonanoyl group, a decanoyl group, a undecanoyl group, a dodecanoyl group, a cyclohexanoyl group, a methylcyclohexanoyl group and the like. The acyl group has favorably from 1 to 12 carbon atoms.

In the general formula (B), $R^2$ represents an alkyl group with or without an ether bond, a cycloalkyl group, an aryl group or an aralkyl group. Examples of the alkyl group include a methyl group, an ethyl group, a propyl group, a butyl group, a pentyl group, a hexyl group and the like, and are preferably those which have from 1 to 6 carbon atoms. The alkyl group having an ether bond includes, for example, a methoxymethyl group, a methoxyethyl group, an ethoxymethyl group, an ethoxyethyl group, a propoxymethyl group, a propoxyethyl group, a butoxymethyl group, a butoxyethyl group, a pentoxymethyl group, a pentoxyethyl group, an isopentenoxymethyl group, an isopentenoxyethyl group and the like. The cycloalkyl group includes, for example, a cyclopentyl group, a cyclohexyl group or the like. The aryl group is, for example, a phenyl group, a tolyl group, a xylyl group or the like. The aralkyl group includes, for example, a benzyl group, a 1-phenylethyl group, a 2-phenylethyl group, a 3-phenylpropyl group or the like.

Specific examples of the isopentenyl compounds of the general formula (A) include: isopentenyl alcohol; isopentenyl ethers such as isopentenyl methyl ether, isopentenyl ethyl ether, isopentenyl propyl ether, isopentenyl butyl ether, isopentenyl amyl ether, isopentenyl hexyl ether, isopentenyl cyclohexyl ether, isopentenyl cyclopentenyl ether, isopentenyl benzyl ether, isopentenyl phenyl ether and the like; and esters such as isopentenyl formate, isopentenyl acetate, isopentenyl propionate, isopentenyl butyrate, isopentenyl valerate, isopentenyl caprylate, isopentenyl caprate, isopentenyl pelargonate, isopentenyl undecylate, isopentenyl laurate, isopentenyl benzoate, isopentenyl cyclohexylcarbonate, isopentenyl phenylacetate, isopentenyl benzylacetate, and the like. Specific examples of the isopentenyl compounds (B) include methyl prenyl ether, ethyl prenyl ether, propyl prenyl ether, butyl prenyl ether, amyl prenyl ether, isoamylprenyl ether, hexyl prenyl ether, cyclohexyl prenyl ether, cyclopentyl prenyl ether, benzyl prenyl ether, phenyl prenyl ether and the like.

The unsaturated compounds which are capable of forming alternate copolymers in combination with the above-indicated isopentenyl compounds are: maleic anhydride; maleimides such as maleimide, N-methylmaleimide, N-ethylmaleimide, N-(carboxylphenyl)maleimide, N-propylmaleimide, N-butylmaleimide, N-phenylmaleimide, N-(sulfophenyl)maleimide and the like; dialkyl maleates such as dimethyl maleate, diethyl maleate, dipropyl maleate, dibutyl maleate, dihexyl maleate, dioctyl maleate and the like; dialkyl fumarates such as dimethyl fumarate, diethyl fumarate, dipropyl fumarate, dibutyl fumarate, dihexyl fumarate, dioctyl fumarate and the like; acrylic esters such as methyl acrylate, ethyl acrylate, propyl acrylate, methyl 2-chloroacrylate, methyl 2-fluoroacrylate, ethyl 2-fluoroacrylate and the like; and unsaturated nitriles such as acrylonitrile, 2-chloroacrylonitrile, 2-cyanoacrylonitrile and the like.

The alternate copolymers of the invention should preferably have an average molecular weight of about 3,000 to 300,000.

The isopentenyl compound of the general formula (A) or (B) can be copolymerized with the unsaturated compound by known techniques. For instance, there may be used solution polymerization in organic solvent, emulsion or suspension polymerization in water, or solution, suspension or emulsion polymerization in a mixed solvent of a water-soluble organic solvent and water. Alternatively, since the isopentenyl compound does not polymerize by itself, solution polymerization using large excess of the compound as a monomer and solvent is possible. From the standpoint of the reactivity, reaction procedures and treatment for the reaction mixture, it is preferred that the isopentenyl compound is used in excess, partly as a solvent. For the copolymerization reaction, a radical initiator such as an azo compound or organic peroxide may be used as a polymerization initiator especially in an organic solvent or in a solution polymerization using an isopentenyl compound as a solvent. For polymerization in water, persulfates, hydrogen peroxide and the like are used. For the polymerization in a mixed solvent of a water-soluble organic solvent and water, the above-indicated polymerization initiators are suitably used.

The polymerization temperature is not critical and should preferably be a temperature at which the polymerization initiator used decomposes quickly.

The formation of a 1:1 alternate copolymer by the above reaction has been confirmed from elementary analysis, IR absorption spectrum, NMR spectrum and the like. These analyses reveal that the copolymers have, respectively, a 1:1 composition irrespective of the mixing ration between two ingredients.

The alternate copolymers of this invention consist of monomers having a hydroxyl group, an ester group or an acid anhydride group and are easily soluble in chemically inactive and commonly used solvents, so that they could be subjected to intra- or inter-molecular reaction to give crosslinked polymers and high performance polymers. Especially, since alternate copolymers containing maleic anhydride as comonomer have a highly reactive acid anhydride group in the polymer, they readily react with compounds having a nucleophilic functional group such as a hydroxyl group, an amino group, a mercapto group, an epoxy group, an isocyanate group or the like, thereby forming a covalent bond. Alternatively, the maleic anhydride units contained in the copolymers may form an ionic bond with various metal ionic compoounds. The alternate copolymers of the invention can be imparted with various characteristic properties by combination of the structural units (I) and (II). Thus, the copolymers have thus wide utility as polymeric carriers, polymeric surface treating agents, highly water-absorbing resins, ion-exchange resins, medical materials, anti-clouding agents, scale inhibitors, dispersants, adhesives, sizing agents, materials for separation membranes, electronic materials, photoresist materials and the like.

The present invention will now be described in more detail with reference to the following examples.

In the following examples, molecular weight expresses $\overline{M}w$. $\overline{M}w$ and $\overline{M}w/\overline{M}n$ were obtained by calculation from the results of GPC method using polystyrene as a standard, and copolymerization composition ratio was obtained by calculation on the basis of $^1$H-NMR data.

EXAMPLES 1-9

Comonomers indicated in Table 1 were each dissolved in isopentenyl acetate (IPAc) and azobisisobutyronitrile (1.5 mole% based on the comonomer) was provided as an initiator, followed by polymerization at 60° C. for a given time. After completion of the reaction, the polymerization solution was added to a poor solvent with stirring to permit the resultant polymer to precipitate. The yields and analytical data of the copolymers such as elemental analysis, IR, NMR and monomer composition are shown in Table 1 and 2.

TABLE 1

| Example | Amount of comonomer | IPA$_c$ (mmol) | Polymn. Time (Hrs.) | Solv. for re-pptn. | Yield of Polymer (g) | Yield of Polymer (%) | Elementary Anal. [1][2] C | Elementary Anal. H | Elementary Anal. N | Elementary Anal. Cl | $\overline{M}w$ | Compn. Ratio IPA$_c$: Comonomer |
|---|---|---|---|---|---|---|---|---|---|---|---|---|
| 1 | maleic anhydride 0.744 g (7.6 mmol) | 83 | 5 | cyclohexane | 1.26 | 73.5 | 58.67 (58.40) | 6.36 (6.24) | 0.03 (0) | — | 86400 | 50.2:49.8 |
| 2 | diethyl maleate 4.459 g (25.9 mmol) | 64 | 96 | cyclohexane | 1.53 | 19.7 | 60.32 (59.98) | 8.32 (8.05) | 0.16 (0) | — | 7200 | 51.5:48.5 |
| 3 | N—ethylmaleimide 0.95 g (7.6 mmol) | 79 | 5 | cyclohexane | 1.67 | 86.2 | 61.66 (61.16) | 7.79 (8.29) | 5.55 (5.49) | — | 150000 | 50.4:49.6 |
| 4 | N—phenylmaleimide 3.943 g (22.8 mmol) | 82 | 41 | diethyl ether | 6.45 | 93.9 | 67.86 (67.76) | 6.11 (6.35) | 4.90 (4.65) | — | 190000 | 48.0:52.0 |
| 5 | diethyl fumarate 4.019 g (23.3 mmol) | 82 | 41 | cyclohexane | 5.06 | 72.4 | 59.68 (59.98) | 8.18 (8.05) | 0.06 (0) | — | 25000 | 48.2:51.8 |
| 6 | methyl acrylate 0.67 g (7.8 mmol) | 84 | 42 | cyclohexane | 1.21 | 72.5 | 62.23 (61.66) | 8.78 (8.47) | 0.26 (0) | — | 27000 | 46.5:53.5 |
| 7 | acrylonitrile 0.43 g (8.1 mmol) | 84 | 42 | cyclohexane | 0.84 | 57.4 | 66.45 (66.27) | 8.58 (8.34) | 8.21 (7.73) | — | 4700 | 51.6:48.4 |
| 8 | 2-chloroacrylnitrile 2.44 g (27.9 mmol) | 83 | 16 | cyclohexane | 0.930 | 15.5 | 57.17 (55.69) | 6.83 (6.54) | 7.65 (6.49) | 17.00 (16.44) | 5600 | 51.7:48.3 |
| 9 | dioctyl fumarate | 82.5 | 24 | ethanol | 4.14 | 38.1 | 69.11 | 10.71 | 0.04 | — | 75000 | 45.4:54.6 |

TABLE 1-continued

| Example | Amount of comonomer | IPA$_c$ (mmol) | Polymn. Time (Hrs.) | Solv. for re-pptn. | Yield of Polymer (g) | Yield of Polymer (%) | Elementary Anal. [1][2] C | Elementary Anal. [1][2] H | Elementary Anal. [1][2] N | Elementary Anal. [1][2] Cl | $\bar{M}w$ | Compn. Ratio IPA$_c$: Comonomer |
|---|---|---|---|---|---|---|---|---|---|---|---|---|
| | 7.91 g (23.2 mmol) | | | | | | (71.19) | (10.57) | (0) | — | | |

[1] ( ): theoretical value for a 1:1 alternate copolymer
[2] Nitrogen is resulted from azobisisobutyronitrile used as radical initiator.

TABLE 2

| Example | Comonomers | i.r. | $^1$H—NMR |
|---|---|---|---|
| 1 | maleic anhydride | 1775, 1850 cm$^{-1}$: C=O stretching, 1735 cm$^{-1}$: C=O stretching, 1230 cm$^{-1}$: —C—O stretching | 4.10 ppm: —CH$_2$OCMe (C=O), 3.25~3.68 ppm: —CH—CH— (with anhydride), 1.10~1.35 ppm: CH$_3$—C— |
| 2 | diethyl maleate | 1720, 1735 cm$^{-1}$: C=O stretching, 1230 cm$^{-1}$: C—O stretching | 4.08 ppm: —COCH$_2$Me, —CH$_2$OCMe |
| 3 | N—ethylmaleimide | 1685, 1700, 1735 cm$^{-1}$: C=O stretching, 1230 cm$^{-1}$: C=O stretching | 4.08 ppm: —CH$_2$OC—Me, 3.43, 3.00 ppm: —CH—CH— (with imide) |
| 4 | N—phenylmaleimide | 1705, 1720, 1735 cm$^{-1}$: C=O stretching, 1230 cm$^{-1}$: C—O stretching, 1595 cm$^{-1}$: phenyl group, skeletal vibration | 7~7.5 ppm: —C$_6$H$_5$, 4.17 ppm: —CH$_2$OCMe |
| 5 | diethyl fumarate | 1725, 1740 cm$^{-1}$: C=O stretching, 1230 cm$^{-1}$: C—O stretching | 4.08 ppm: —CH$_2$OCMe, 2.5~3.0 ppm: —CH(CO$_2$Et)—CH(CO$_2$Et)— |
| 6 | methyl acrylate | 1730, 1720 cm$^{-1}$: C=O stretching, 1230 cm$^{-1}$: C—O stretching | 4.00 ppm: —CH$_2$OCMe, 2.45 ppm: —CH (CH$_3$O—C=O) |
| 7 | acrylonitrile | 2235 cm$^{-1}$: C≡N stretching vibration, 1730 cm$^{-1}$: —C=O stretching, 1230 cm$^{-1}$: C—O stretching | 4.08 ppm: —CH$_2$OCMe, 2.88 ppm: —CHCN |
| 8 | 2-chloroacrylonitrile | 2230 cm$^{-1}$: C≡N stretching, 1730 cm$^{-1}$: C=O stretching, 1228 cm$^{-1}$: C—O stretching | 4.20 ppm: —CH$_2$OCMe, 2.5~3.0 ppm: —CH$_2$—C(Cl)(CN) |
| 9 | dioctyl fumarate | 1720, 1730 cm$^{-1}$: C=O stretching, 1230 cm$^{-1}$: C—O stretching | 3.74~4.20 ppm: —CH$_2$OC—R, 2.43~3.05 ppm: —CH(C(=O)OR)—CH(C(=O)OR)— |

EXAMPLES 10–12

0.055 moles of each of various isopentenyl carboxylates indicated in Table 3 and 0.05 moles of maleic anhydride were copolymerized, using azobisisobutyronitrile (0.6 mole% based on the maleic anhydride) as an initiator, in 56.3 g of a mixed solvent of ethyl acetate/tertiary butanol (75/25) at 65° C. for a given time. After completion of the eaction, the polymerization solution was added to a poor solvent in which the resultant polymer was precipitated. The results are summarized in Table 3 and the results of IR and NMR analyses are shown in Table 5. The solubility of the copolymers obtained in Examples 10, 11 and 12 together with that of the copolymer obtained in Example 1 was examined at room temperature. The results are shown in Table 6.

maleic anhydride) at 65° C. for 5 hours under conditions indicated in Table 4. The resultant polymer precipitated as a powder as the polymerization proceeded. After

TABLE 3

| Example | Isopentenyl carboxylate | Solv. for Polymn. | Polymn. Time (Hrs.) | Solv. for re-pptn. | Yield (%) | Elementary Anal.[1][2] C | H | N | $\overline{Mw}$ | Copolymn. Compn. ratio isopentenyl carboxylate: maleic anhydride |
|---|---|---|---|---|---|---|---|---|---|---|
| 10 | isopentenyl butyrate | ethylacetate/ t-butanol (75/25) | 8 | cyclohexane/ benzene (1/1) | 65.5 | 61.22 (61.42) | 7.26 (7.09) | 0.01 | 27200 | 48.9:51.1 |
| 11 | isopentenyl n-caprylate | ethylacetate/ t-butanol (75/25) | 5.5 | cyclohexane | 26.1 | 64.17 (65.81) | 8.24 (8.39) | 0.09 | 17500 | 50.0:50.0 |
| 12 | isopentenyl laurate | ethylacetate/ t-butanol (75/25) | 5 | t-butanol | 54.1 | 68.15 (68.85) | 9.57 (9.27) | 0.06 | 103300 | 50.0:50.0 |

[1]( ): theoretical value for a 1:1 alternate copolymer
[2]Nitrogen is resulted from azobisisobutyronitrile used as radical initiator.

EXAMPLES 13–14

Methyl prenyl ether or methyl isopentenyl ether were polymerized with maleic anhydride, using azobisisobutyronitrile as an initiator (0.06 mole% based on the completion of the reaction, the powder was dissolved in acetone and then the solution was added to cyclohexanone to allow the resultant polymer to precipitate. The results are shown in Table 4 and 5.

TABLE 4

| Example | Isopentenyl compound (moles) | Maleic anhydride (moles) | Solv. for Polymn. | Solv. for re-pptn. | Yield (%) | Elementary Anal.[2] C | H | $\overline{Mw}$ ($\overline{Mw}/\overline{Mn}$) | Copolymn. Compn. ratio isopentenyl compound: maleic anhydride |
|---|---|---|---|---|---|---|---|---|---|
| 13 | methyl prenyl ether[1] (0.5) | 0.05 | — | cyclohexane | 23.5 | 59.32 (60.61) | 7.14 (7.07) | 5200 (1.39) | 48.7:51.3 |
| 14 | methyl isopentenyl ether (0.055) | 0.05 | ethylacetate/ t-butanol (75/25) | cyclohexane | 76.7 | 58.59 (60.61) | 6.92 (7.07) | 2800 (1.49) | 51.2:48.8 |

[1]Methyl prenyl ether was used in excess as a monomer and solvent.
[2]( ): theoretical value for a 1:1 alternate copolymer

TABLE 5

| Example | Isopentenyl compound | i.r. | $^1$H—NMR |
|---|---|---|---|
| 10 | isopentenyl butyrate | 1850, 1775 cm$^{-1}$ $\nu_{C=O}$ (—CH——CH—, CO, CO, O) 1735 cm$^{-1}$, $\nu_{C=O}$ (—CH$_2$—O—COR) 1230 cm$^{-1}$, $\nu_{C=O}$ (—CH$_2$—O—COR) | 4.10 ppm: —CH$_2$O—CR ‖ O 3.3~3.6 ppm —CH——CH— CO, CO, O 1.2~1.4 ppm: —CH$_2$—C(CH$_3$)—CH— |
| 11 | isopentenyl caprylate | 1850, 1775 cm$^{-1}$ $\nu_{C=O}$ (—CH——CH—, CO, CO, O) 1735 cm$^{-1}$, $\nu_{C=O}$ (—CH$_2$—O—COR) 1230 cm$^{-}$, $\nu_{C=O}$ (—CH$_2$—O—COR) | 4.2 ppm: —CH$_2$—O—COR 3.3~3.7 ppm —CH——CH— CO, CO, O 1.3 ppm: —CH$_2$—C(CH$_3$)—CH— |
| 12 | isopentenyl laurate | 1850, 1775 cm$^{-1}$ $\nu_{C=O}$ (—CH——CH—, CO, CO, O) 1735 cm$^{-1}$, $\nu_{C=O}$ (—CH$_2$—O—COR) 1230 cm$^{-1}$, $\nu_{C=O}$ (—CH$_2$—O—COR) | 4.2 ppm: —CH$_2$OCR ‖ O 3.3~3.5 ppm —CH——CH— CO, CO, O 1.1 ppm: —CH$_2$—C(CH$_3$)—CH— |

TABLE 5-continued

| Example | Isopentenyl compound | i.r. | $^1$H—NMR |
|---|---|---|---|
| 13 | methyl prenyl ether | 1860, 1780 cm$^{-1}$ $\nu_{C=O}$ (—CH—CH—, CO, CO, O); 1180 cm$^{-1}$, $\nu_{C-O}$ (—CH$_2$—O—CH$_3$) | 3.4~3.7 ppm: —CH—CH—, CO, CO, O; 3.2 ppm: —OC$\underline{H}_3$; 1.1~1.3 ppm: —CH$_2$—C(CH$_3$)—CH—, C$\underline{H}_3$ |
| 14 | methyl isopentenyl ether | 1860, 1785 cm$^{-1}$ $\nu_{C=O}$ (—CH—CH—, CO, CO, O); 1180 cm$^{-1}$, $\nu_{C-O}$ (—CH$_2$—O—CH$_3$) | 3.3~3.6 ppm: —CH—CH—, CO, CO, O; 3.1~3.2 ppm: —OC$\underline{H}_3$; 1.1~1.3 ppm: —CH$_2$—C(C$\underline{H}_3$)— |

TABLE 6

| | Copolymers obtained in Examples | | | |
|---|---|---|---|---|
| Solvent | Example 1 | Example 10 | Example 11 | Example 12 |
| acetone | O | O | O | O |
| methyl ethyl ketone | O | O | O | O |
| methyl isobutyl ketone | X | O | O | O |
| cyclohexanone | O | O | O | O |
| isophorone | O | O | O | O |
| diethyl ether | X | X | X | X |
| tetrahydrofuran | O | O | O | O |
| 1,4-dioxane | O | O | O | O |
| glyme | X | O | O | O |
| diglyme | X | O | O | O |
| ethyl acetate | X | O | O | O |
| butyl acetate | X | O | O | O |
| ethyl cellosolve acetate | X | O | O | O |
| toluene | X | X | O | O |
| benzene | X | X | O | O |
| DMF | O | O | O | O |
| DMSO | O | O | O | O |
| tertiary butyl alcohol | X | X | X | X |

O: soluble
X: insoluble

EXAMPLE 15

0.972 g (5.7 mmols) of N-phenylmaleimide was dissolved in 10.62 g (83 mmols) of isopentenyl alcohol, to which azobisisobutyronitrile (0.05 mole% based on the N-phenylmaleimide), followed by polymerization at 60° C. for 24 hours. After completion of the polymerization, 20 ml of dimethylformamide was added so as to make a homogeneous solution, followed by precipitation in diethyl ether to obtain 1.34 g of a polymer (polymer yield of 78%).

Elementary analysis C: 67.89% (69.48); H: 6.20% (6.56); N: 5.41% (5.40). ( ): theoretical value for a 1:1 alternate copolymer.

I.R. 3450 cm$^{-1}$ (broad): O—H stretching, 1700 cm$^{-1}$: C=O stretching, 1595 cm$^{-1}$: skeletal vibration of the phenyl group $^1$H-NMR 7.15–7.60 ppm phenyl, 1.2–1.5 ppm 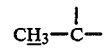

Copolymerization composition ratio: (isopentenyl alcohol/N-phenyl maleimide)=44.2/55.8 $\overline{M}w=69600$

EXAMPLE 16

12.75 g (99.6 moles) of isopentenyl acetate, 20 ml of a chlorobenzene solution of vinylidene cyanide (containing 3.0 g (38.4 mmols) of vinylidene cyanide) and 20 mg of azobisisobutyronitrile were charged into a glass ampoule and allowed to stand at a temperature of 60° C. for 24 hours. Thereafter, the resultant precipitate was washed with xylene to obtain 2.5 g of an alternate copolymer (yield 33.8%).

Elementary analysis: C=63.49%; H=6.40%; N=15.48%; (64.06); (6.84); (15.58); ( ): theoretical vaue for a 1:1 substrate copolymer.

I.R. 1720 cm$^{-1}$: C=O, 1225 cm$^{-1}$: C—O.

$^1$H-NMR 4.27 ppm

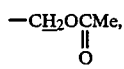

2.5–2.7 ppm

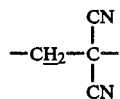

Copolymerization composition ratio: (isopentenyl acetate/vinylidene cyanide)=52.9/47.1
$\overline{Mw}=3200$

REFERENCE 1

10.5 g ($8.19\times10^{-2}$ moles) of isopentenyl acetate and 20 mg of azobisisobutyronitrile were charged into a glass ampoule, and allowed to stand at 60° C. for 48 hours. The resultant reaction solution was added to cyclohexane, but any precipitate did not formed.

EXAMPLE 17

14.08 g (0.11 moles) of isopentenyl acetate and 9.8 g (0.1 mole) of maleic anhydride were added to 112.6 g of a mixed solvent of ethyl acetate/tertiary butanol (75/25), to which 0.1 g (0.6 mole% based on the maleic anhydride) of azobisisobutyronitrile was added under agitation, followed by reaction at 60°–63° C. for 5 hours. After completion of the reaction, the resultant polymer formed a block. After breakage of the block, the broken polymer was removed by filtration, washed and dried to obtain 9.4 g (yield 41.6%) of a powder. The filtrate was subjected to analysis of residual monomers by gas chromatography and alkaline titration. As a result, it was found that the conversion of the isopentenyl acetate was 39.5% and the conversion of the maleic anhydride was 41.9%. The elementary analysis of the polymer revealed C: 57.92% (58.41%) and H: 61.7% (6.19%), these values being substantially coincident with the theoretical as an alternate copolymer. 0.5 g of the polymer and 0.18 g of sodium hydroxide were added to 50 g of methanol and heated under reflux for 3 hours. The resultant solution was poured into a 0.3N sulfuric acid aqueous solution for neutralization to cause the polymer to precipitate, followed by removal by filtration, washing and drying. The resultant polymer was subjected to analysis with an infrared spectrophotometer, revealing that the ester group and the acid anhydride group were, respectively, converted into a hydroxyl group ($\nu_{O-H}$: 3500 cm$^{-1}$) and a carboxyl group ($\nu_{C=O}$: 1720 cm$^{-1}$). In addition, good results were obtained with respect to the elementary analysis.

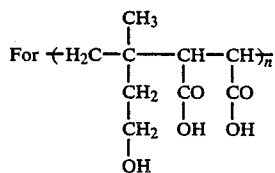

C: 53.93% (53.47%); H: 6.48% (6.93%); ( ): theoretical value for a 1:1 alternate copolymer.

EXAMPLE 18

342 g of ethyl acetate, 112.8 g (0.42 moles) of isopentenyl laurate, 39.2 g (0.40 moles) of maleic anhydride and 0.66 g (1 mole% based on the maleic anhydride) of azobisisobutyronitrile were charged into a 1 liter autoclave equipped with an agitator and agitated for 30 minutes. After the atmosphere of the solution was substituted with nitrogen at room temperature, the solution was maintained at 65° C. for 5 hours.

After completion of the polymerization, the inner liquid was taken out and the solvent was distilled off by means of a rotary evaporator, the resultant polymer was dried in vacuum at 40° C. to obtain 142.1 g of an alternate copolymer of the isopentenyl laurate and the maleic anhydride (polymer yield of 97% based on the charged maleic anhydride, $\overline{Mw}=105,000$, $\overline{Mw}/\overline{Mn}=2.3$). From the NMR data, it was confirmed that the polymer was an alternate copolymer of isopentenyl laurate and maleic anhydride at 1:1.

EXAMPLE 19

The procedure of Example 18 was repeated except that 101.0 g (0.42 moles) of isopentenyl caprate was used instead of the isopentenyl laurate, thereby 132.0 g of an alternate copolymer of isopentenyl caprate and maleic anhydride was obtained (polymer yield of 97.5% based on the charged maleic anhydride, $\overline{Me}=94,000$, $\overline{Mw}/\overline{Mn}=2.1$). From the NMR data, it was confirmed that the copolymer was an alternate copolymer if isopentenyl caprate and maleic anhydride at 1:1.

APPLICATION 1

The copolymers obtained in Examples 18 and 19 were subjected to a performance test as a water-soluble hot-melt adhesive. The polymers were each extruded at a maximum temperature of 200° C. to give a 0.2 mm thick sheet. The sheet was interposed between aluminum plates, each having a size of 50 mm×25 mm (adhesion area of 25 mm×25 mm) and pressed at a temperature of 210° C. under a pressure of 5 kg/cm$^2$, thereby the aluminum plates were bonded together.

The tensile strength of the bonded plates was measured with a tensile tester (Instron Company) under the condition of a pulling speed of 50 mm/minute to give the following results.
Copolymer: Adhesion Force;
Polymer of Example 18: 34 kg/cm$^2$;
Polymer of Example 19: 18 kg/cm$^2$.

When the two types of the bonded aluminum plates were each immersed in a 0.1N sodium hydroxide aqueous solution at 80° C., the copolymers were dissolved to permit the aluminum plates to be readily separated. This means that the copolymers have the properties as a water-soluble hot-melt adhesive.

APPLICATION 2

The copolymer obtained in Example 18 was evaluated as a water-absorbing resin.

73.3 g (0.2 moles) of a powder of the polymer and 11.2 g of sodium hydroxide (0.7 equivalent quantities to maleic anhydride units) were agitated in 200 g of ethanol at 65° C. for 3 hours, followed by filtration and drying to obtain a powder of the Na salt of the copolymer. Equal weight of the Na salt of the copolymer and hot-melt type polyvinyl alcohol were blended with a kneader (Brabender Company) at 110° C. The resultant compound was pressed under conditions of 180° C. and 50 kg/cm$^2$ for 10 minutes to obtain a piece of sheet having 1 mm thickness. The thus obtained sheet was subjected to heat treatment at 150° C. for 1 hour for crosslinking reaction between the carboxyl groups and the hydroxyl groups and resulted in insolubilization in water. Thereafter, the sheet was immersed in distilled water at room temperature for 1 hour and subjected to water-absorbing test to obtain water-absorption factor of 8. This means that the copolymer serves as a water-absorbing resin.

What is claimed is:

1. An alternate copolymer which consists essentially of structural units [I] based on an isopentenyl compound of the following formula (A) or (B)

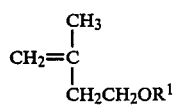

in which $R^1$ represents a hydrogen atom, an alkyl group with or without an ether bond, an aryl group, a cycloalkyl group, an aralkyl group or an acyl group, or

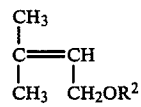

in which $R^2$ is an alkyl group with or without an ether bond, a cycloalkyl group, an aryl group or an aralkyl group, and structural units [II] based on an unsaturated compound selected from the group consisting of maleic anhydride, dialkyl maleates, maleimides, dialkyl fumarates, unsaturated nitriles, and acrylic esters.

2. An alternate copolymer according to claim 1, wherein $R^1$ represents an alkyl group having from 1 to 6 carbon atoms.

3. An alternate copolymer according to claim 1, wherein $R^1$ repesents an acyl group having from 1 to 12 carbon atoms.

4. An alternate copolymer according to claim 1, wherein $R^2$ represents an alkyl group having from 1 to 6 carbon atoms.

5. An alternate copolymer according to claim 1, wherein said copolymer has an average molecular weight of from about 3,000 to 300,000.

* * * * *